July 12, 1960    W. M. FAULKS    2,944,365
PORTABLE ELECTRIC JIFFY DUSTER
Filed April 24, 1956

INVENTOR
W. M. FAULKS
BY
ATTORNEY

United States Patent Office 2,944,365
Patented July 12, 1960

2,944,365

PORTABLE ELECTRIC JIFFY DUSTER

W. M. Faulks, San Angelo, Tex.
(P.O. Box 1114, Fort Stockton, Tex.)

Filed Apr. 24, 1956, Ser. No. 580,252

1 Claim. (Cl. 43—148)

This invention relates to the treatment, extermination, and control of pests of various kinds including those which constitute a nuisance beneath floors, and closets, attics, flower beds, in gardens, in and around places frequented by human beings, where silver fish, scorpions, centipedes, black widow spiders and other objectionable insects and pests are found.

The invention also relates to the method and equipment employed in eliminating and controlling such insects and pests including apparatus for supplying insecticidal and fungicidal substances in the attacking of the problem including particularly portable dust discharging and distributing apparatus.

It has been difficult to destroy pests particularly in inaccessible locations. The blower described in this application affords a simple and handy device for directing and distributing insecticidal or fungicidal powder or other substance used in undertaking to destroy the same in such inaccessible locations.

It is an object of the invention to overcome the problems enumerated and to provide a relatively simple small and compact electrically driven dusting machine which is self-contained, portable, and inexpensive, and which is sufficiently powerful to forcefully direct and distribute insecticidal and fungicidal powders into and over a particular area.

Another object of the invention is to provide a relatively small portable machine of the character indicated having durable reinforced walls, providing a hopper for dust or powder to be dispensed and also having means for varying or controlling the amount of powder discharged, as well as a machine with wall openings which admit air for cooling as well as for use in the distribution of the powder.

Figure 1:
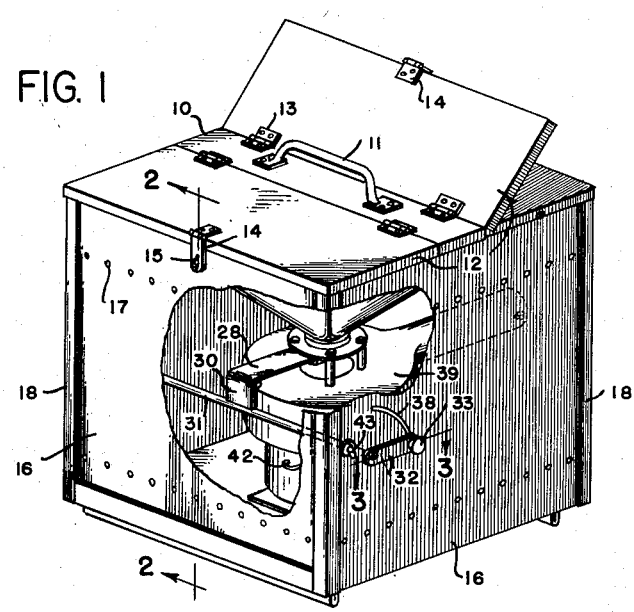
Figure 2:
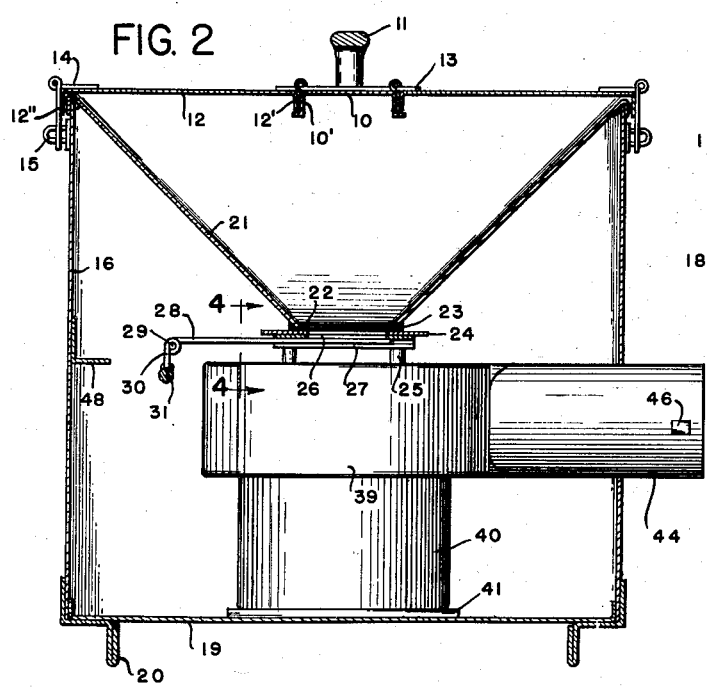
Figure 3:
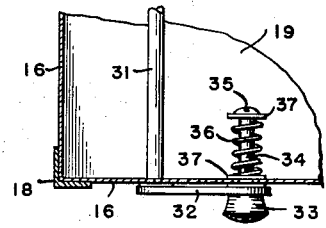
Figure 3:
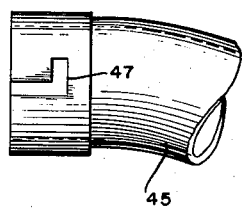

Other objects and advantages of the invention will be apparent from the following description taken in conjunction with the accompanying drawing wherein:

Fig. 1 is a perspective illustrating one application of the invention, parts being broken away to reveal the interior;

Fig. 2, a vertical section taken on the line 2—2 of Fig. 1;

Fig. 3, a horizontal section taken on line 3—3 of Fig. 1; and

Figure 4:
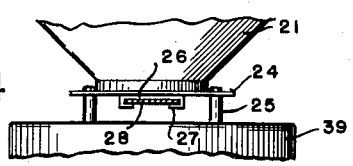

Fig. 4, a fragmentary detail viewed on the line 4—4 of Fig. 2.

Briefly stated the invention comprises a hollow box or six sided casing, all the sides of which are equal. The top of the device includes a center bar which extends across the top and has a carrying handle along the center of same and with a pair of rectangular doors hinged at each side of the center bar. A hopper is provided, the walls of which extend downwardly from the top of the side walls toward the center of the casing where they define a discharge opening at the bottom of the hopper. A control for said discharge opening is provided in the form of a slide valve, the outer end of which is connected by a hinge to an arm fixed to a transverse control rod journalled in the side walls of the casing and having a valve operating lever connected to one end. To the end of the remote end of the lever or crank is attached an operating knob or handle mounted on a pin extending inwardly through an arcuate slot in the wall of the casing and having a cooperating spring-pressed pressure plate bearing against the inner wall of the casing in a manner to offer resistance to the swinging arm and in order to hold the plate valve in any desired position of adjustment.

Beneath the lower end of the hopper is mounted a horizontally disposed centrifugal blower having one end extending from the side of the casing and forming a discharge nozzle. Power is supplied by an electric motor located beneath the blower and a control switch for such motor is located on the exterior of the casing near the valve control lever. Electrical conductors supply electrical energy by means of a plug which fits into an electrical socket connected to a source of power.

Hasps and staples are employed for securing the doors of the hopper in closed position and a rubber gasket is provided between the outer surface of the hopper and the blower for preventing the escape of the contents of the hopper into the casing. The casing is provided with a series of openings which permit the intake of air for cooling the motor and other parts and for intake of air to the blower.

With continued reference to the drawing, the present invention comprises a hollow box or casing including a top, bottom and four sides, all of substantially equal size, and with the top composed of a center bar 10 having a handle 11 by means of which the device may be carried. A pair of lids or doors 12 are pivotally connected by hinges 13 to the center bar 10, hasps 14 and staples 15 being employed for fastening the lids or doors in closed position. The center bar 10 preferably is of sheet metal with downwardly and outwardly disposed side reinforcing side flanges 10', in contact with which the downwardly turned rear edge flange 12' of the door 12 cooperates, such door having a downturned reinforcing flange 12" along its front and ends.

The housing or casing includes upright walls 16 provided with spaced ventilating openings 17 along the upper and lower portions thereof and with the corners of the casing reinforced by corner strips 18 secured in place by a series of welds or in any other desired manner. The bottom 19 of the casing has welded or otherwise attached thereto spaced parallel angle members 20 which serve as rests for the casing when it is placed on a support.

Beneath the top is disposed a hopper 21 having walls which engage the upper edges of the side walls 16 and incline downwardly therefrom toward the center and form a discharge opening 22. The hopper wall which forms the opening 22 seats against a gasket 23 attached to a contact plate 24 mounted on four equally spaced posts 25. Beneath the plate 24 is attached a valve plate retainer 26 having opposed inturned extremities 27 providing a slideway in which is received the valve plate 28 which slides beneath the hopper discharge opening and controls the size thereof. The valve plate 28 is connected by a hinge 29 with an upstanding arm 30 welded or otherwise fixed to a control rod 31 mounted in the opposed side walls 16 of the casing.

The control rod 31 is provided exteriorly of the casing with an arm 32 and a crank handle 33 by means of which the arm 32 may be oscillated to impart corresponding movement to the rod 31. The handle 33 receives and is therefore mounted upon a screw 34 having a screwdriver slot 35 in its end by which the screw may be rotated to thread the same into the handle 33. A spring 36 is located between a pair of washers 37 disposed one in contact with the head of the screw and the other at the opposite end of the spring so that it will act on the wall 16 to resist swinging of the arm 32. The wall 16 is provided with an arcuate slot 38 in which the screw 34 can move.

The posts 25 which support the plate 24 are attached to a horizontally disposed centrifugal blower 39 driven by a motor 40 carried by a base plate 41 attached to the bottom wall 19. The motor is supplied with electrical energy by means of conductors 42, and a switch 43 is located in a position convenient to the handle 33 for controlling the flow of electricity to and the operation of the motor 40.

Thus, when the machine is connected to a source of electrical energy and the switch 43 operated, current will be supplied to the motor 40 to power or drive the blower 39 so that air will be propelled through a discharge nozzle 44 and a hose 45 detachably connected by means of a bayonet joint consisting of, for example, a projection 46 and a bayonet slot 47.

Thus, when the hopper is filled and the discharge valve at the bottom of the same is open fully or to any degree, dust will fall by gravity into the horizontally disposed centrifugal blower 39 and due to the spacing of the plate 24 from the blower by means of the posts 25 air will be sucked into the blower from all sides of the plate so that in effect a venturi is formed which causes the additional drawing by suction of the dust from the hopper into the blower and from which it will be discharged through the nozzle 44 and the hose 45 the remote end of which can be placed in any desired location.

If desired one or more reinforcing braces 48 may be welded or otherwise attached to the inner surface of one or more of the upright walls 16.

It will be obvious to those skilled in the art that various changes may be made in the invention without departing from the spirit and scope thereof and therefore the invention is not limited by that which is illustrated in the drawing and described in the specification but only as indicated in the appended claim.

What is claimed is:

A portable duster having a vertical feed system comprising a housing, a hopper for holding a supply of dust powder mounted in the upper portion of the housing, said hopper having a discharge opening at the bottom thereof, a motor and blower mounted in the lower portion of the housing directly beneath the hopper, said blower having a center intake opening in the top for air and dust powder, said blower opening being in vertical alignment with the discharge opening at the bottom of the hopper thereby providing an unimpeded gravitational flow of dust powder downward from the hopper opening directly into the blower intake opening, vertically disposed mounting means closely adjacent the hopper and blower openings and supporting said hopper above said blower with only a narrow vertical space between said hopper and blower openings acting to positively create a venturi effect about the hopper opening, said mounting means supporting said blower and said hopper in a manner that the narrow spacing is substantially free of all impediments radially and horizontally outwardly whereby air may flow in through the housing converging from substantially all sides into the narrow spacing between the opening of the hopper and creating the venturi effect around substantially the entire hopper opening, a valve mounted directly beneath said hopper opening controlling the flow of dust from said hopper to said blower casing, and means to open and close said valve.

References Cited in the file of this patent

UNITED STATES PATENTS

| 372,124 | Craig | Oct. 25, 1887 |
| 423,814 | Richards | Mar. 18, 1890 |
| 1,229,994 | McWhorter | Jan. 12, 1917 |
| 2,336,113 | McLaughlin | Dec. 7, 1943 |
| 2,348,205 | Chater | May 9, 1944 |
| 2,619,767 | Woock | Dec. 2, 1952 |

FOREIGN PATENTS

| 651,407 | Great Britain | Apr. 4, 1951 |